Figure 1:
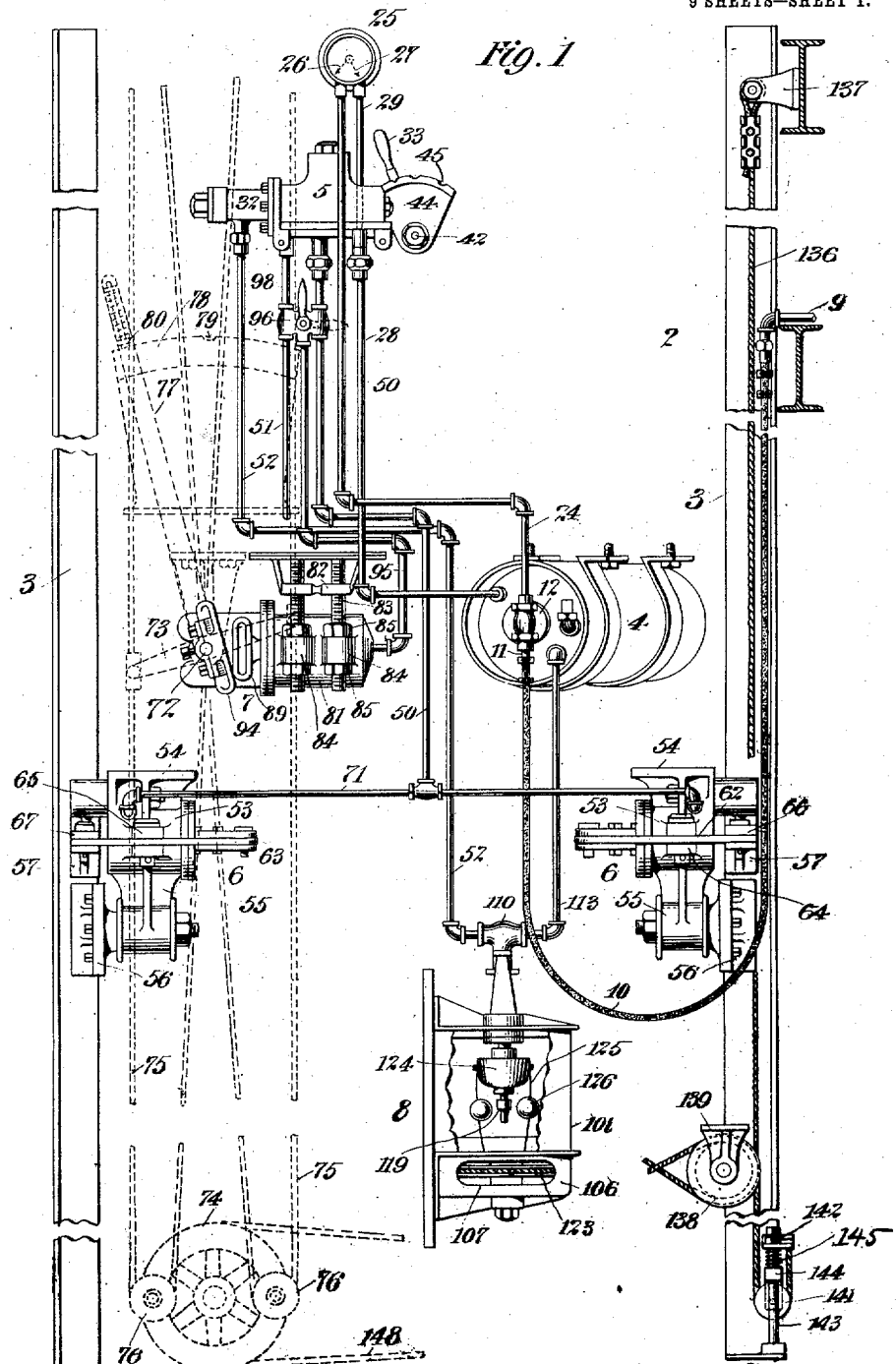

No. 860,986. PATENTED JULY 23, 1907.
A. H. MEECH.
ELEVATOR AIR BRAKE SYSTEM.
APPLICATION FILED APR. 6, 1906.

9 SHEETS—SHEET 1.

Witnesses
Inventor
ALFRED H. MEECH.
By his Attorneys

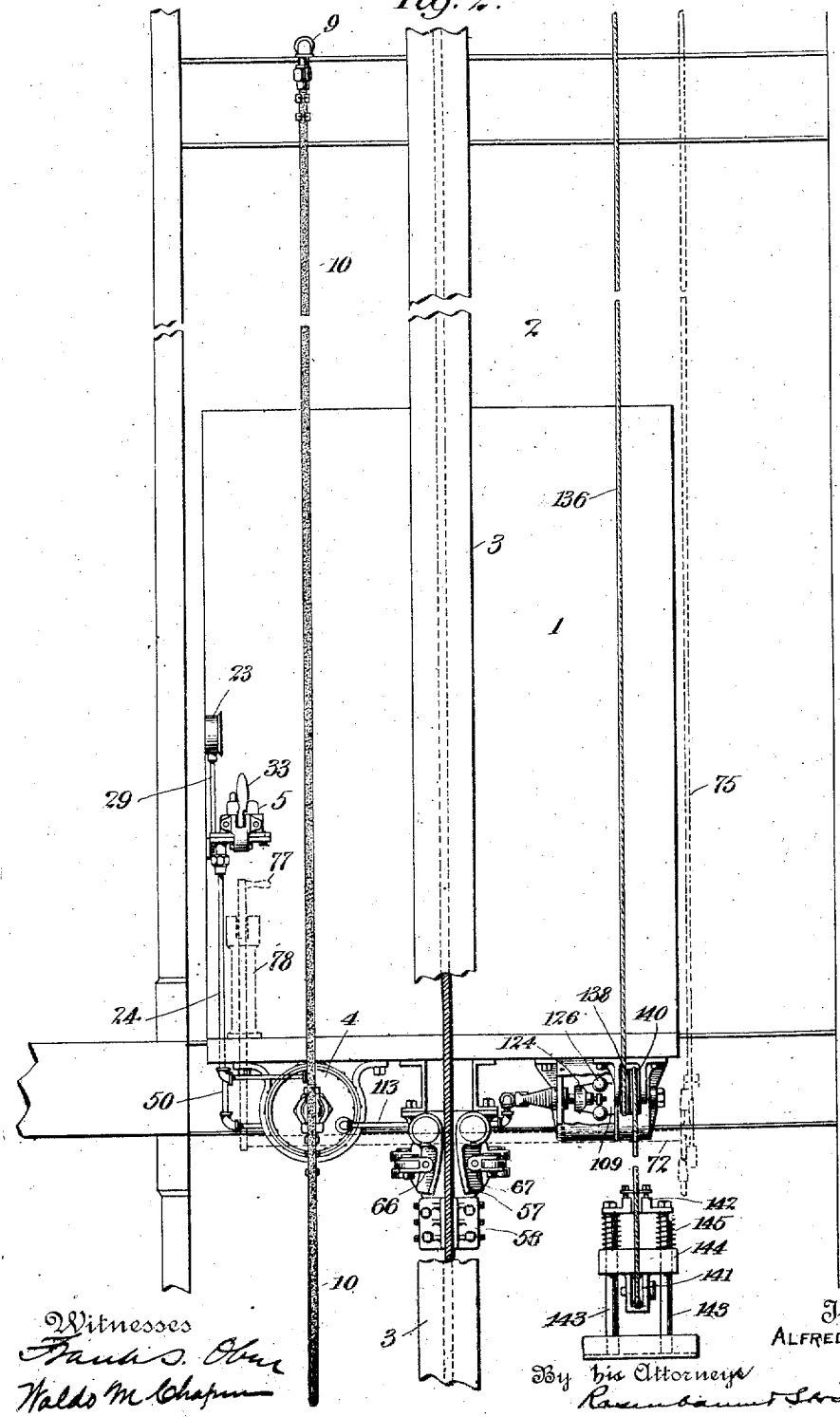

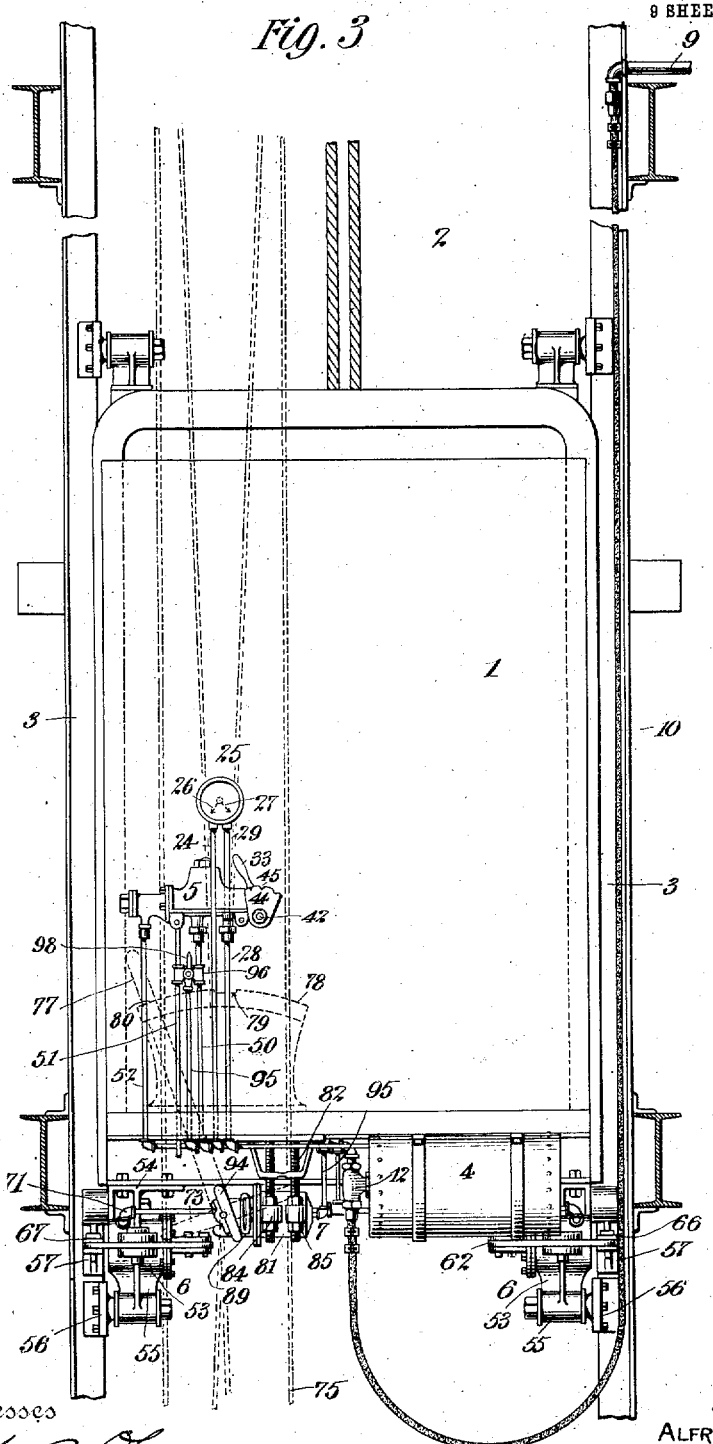

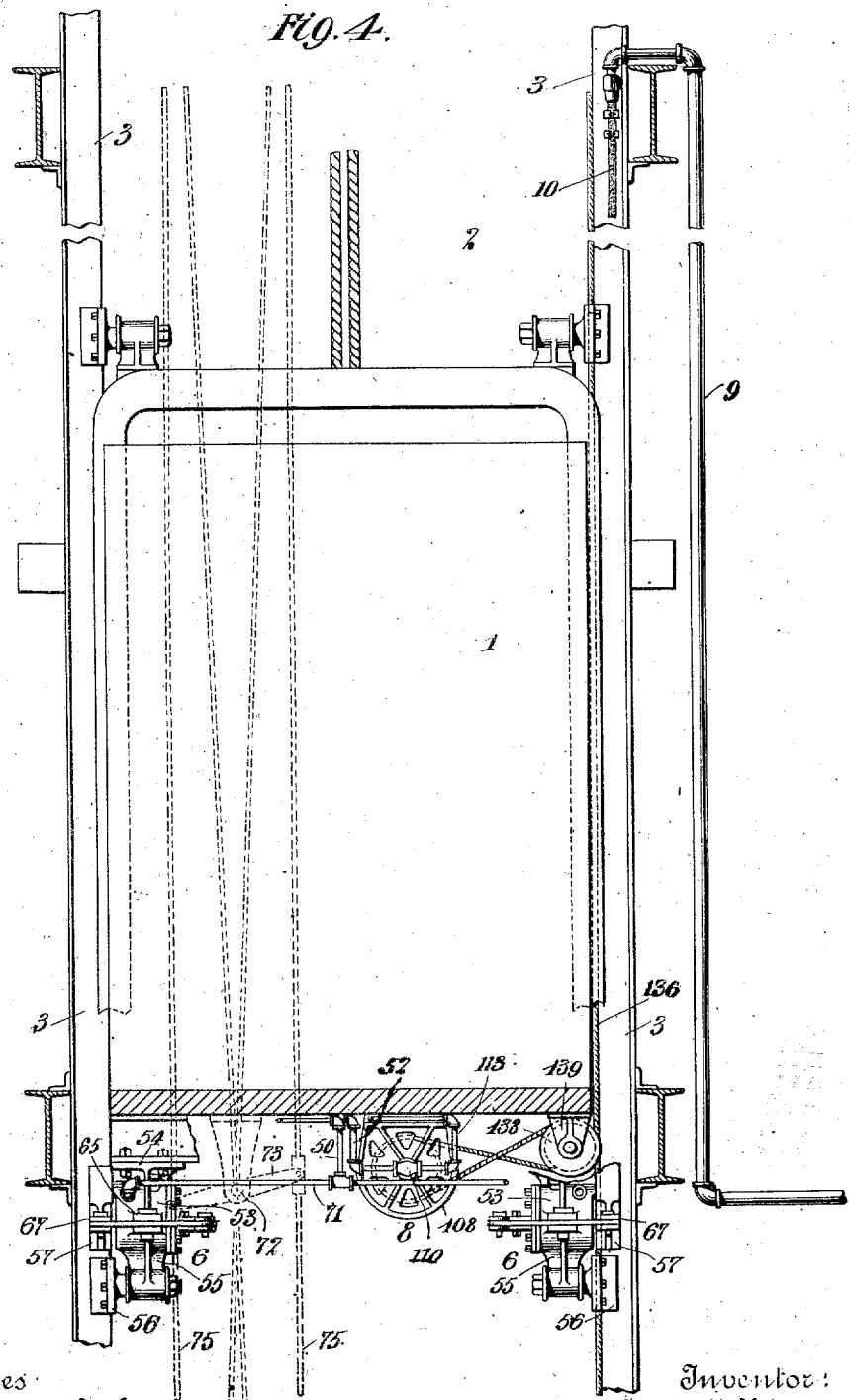

No. 860,986. PATENTED JULY 23, 1907.
A. H. MEECH.
ELEVATOR AIR BRAKE SYSTEM.
APPLICATION FILED APR. 6, 1906.
9 SHEETS—SHEET 5.
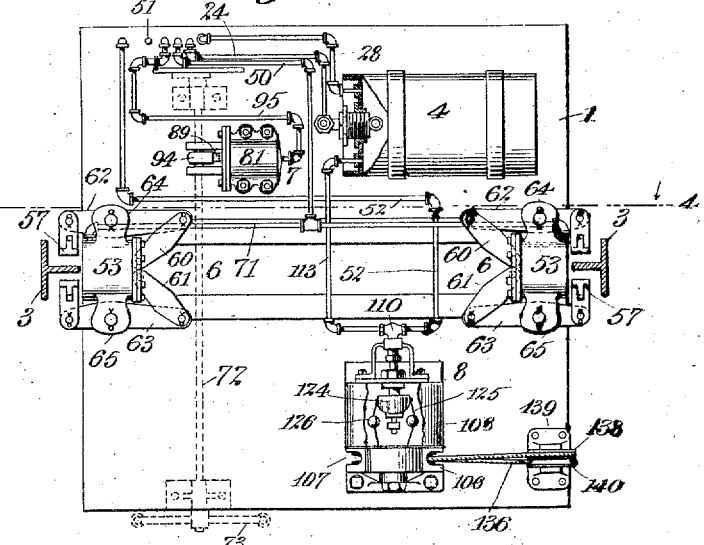
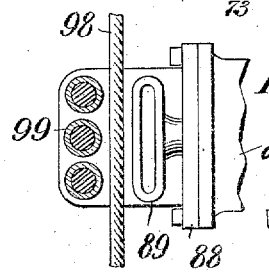
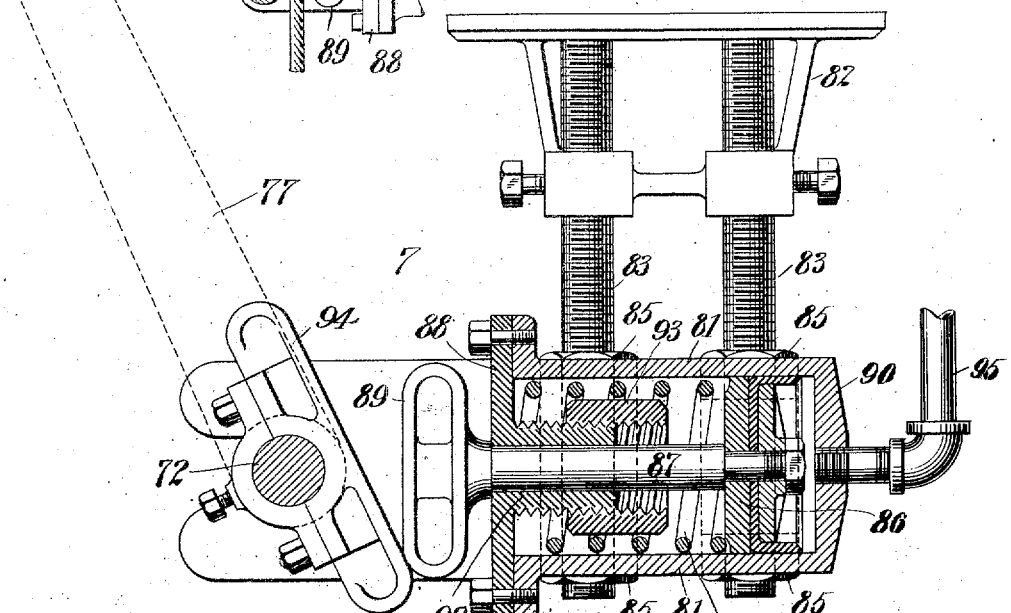
Witnesses
Inventor:—
ALFRED H. MEECH,
By his Attorneys No. 860,986. PATENTED JULY 23, 1907.
A. H. MEECH.
ELEVATOR AIR BRAKE SYSTEM.
APPLICATION FILED APR. 6, 1906.

9 SHEETS—SHEET 6.

Witnesses

Inventor:
ALFRED H. MEECH,
By his Attorneys

No. 860,986. PATENTED JULY 23, 1907.
A. H. MEECH.
ELEVATOR AIR BRAKE SYSTEM.
APPLICATION FILED APR. 6, 1906.

9 SHEETS—SHEET 7.

Witnesses
Frank S. Ober
Waldo M. Chapin

Inventor:
ALFRED H. MEECH,
By his Attorneys
Rosenbaum & Strickridge

No. 860,986. PATENTED JULY 23, 1907.
A. H. MEECH.
ELEVATOR AIR BRAKE SYSTEM.
APPLICATION FILED APR. 6, 1906.
9 SHEETS—SHEET 8.
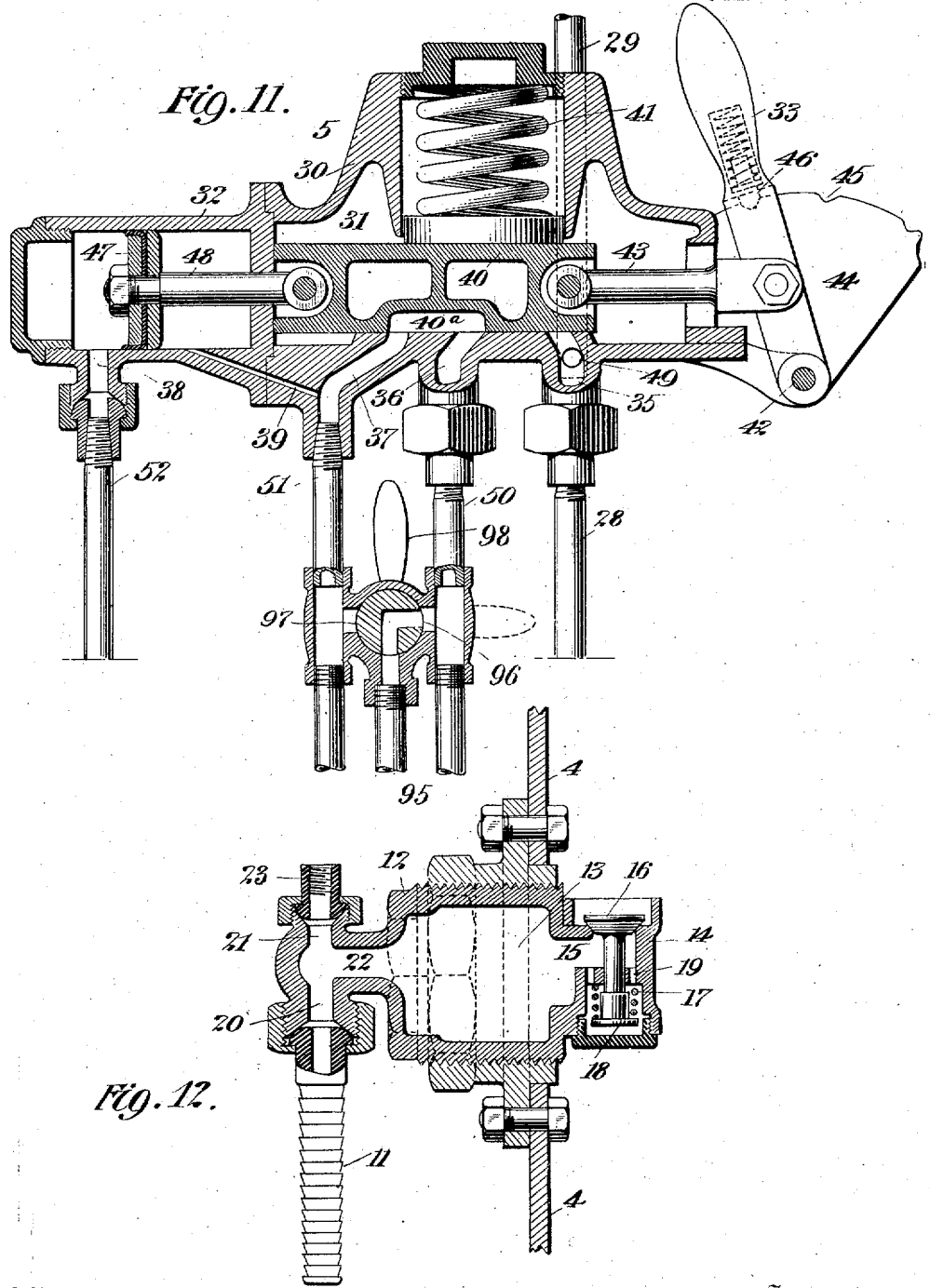

No. 860,986. PATENTED JULY 23, 1907.
A. H. MEECH.
ELEVATOR AIR BRAKE SYSTEM.
APPLICATION FILED APR. 6, 1906.
9 SHEETS—SHEET 9.
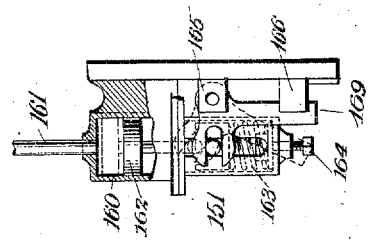
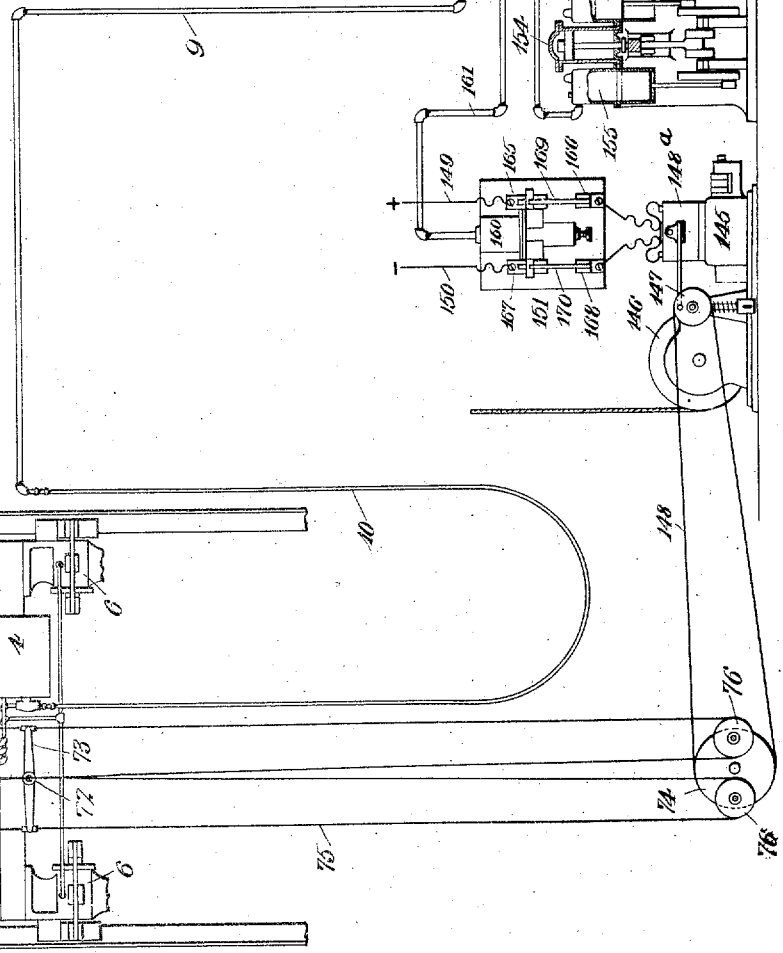
Witnesses
Inventor:-
ALFRED H. MEECH
By his Attorneys

UNITED STATES PATENT OFFICE.

ALFRED H. MEECH, OF CHATHAM, NEW YORK.

ELEVATOR AIR-BRAKE SYSTEM.

No. 860,986.　　　　　　Specification of Letters Patent.　　　　　　Patented July 23, 1907.

Application filed April 8, 1906. Serial No. 310,218.

*To all whom it may concern:*

Be it known that I, ALFRED H. MEECH, a citizen of the United States, residing at Chatham, in the county of Columbia and State of New York, have invented certain new and useful Improvements in Elevator Air-Brake Systems, of which the following is a full, clear, and exact description.

My invention relates to elevator air brake systems, the same being designed for the production of such constructions, combinations and arrangements of instrumentalities as will effectively prevent all dangerous consequences of accidents to elevators, or to the hoisting mechanism therefor, by providing for arresting the movement of the car and stopping the operation of the hoisting mechanism, under all conditions of danger that are met with in actual commercial use.

One of the main objects of the invention is to provide means for automatically cutting off the propelling power for the car when the braking devices are actuated, whereby the hoisting mechanism is prevented from operating in opposition to the restraining action of the brakes.

Another object of the invention is to provide automatic speed-controlled mechanism for throwing the braking devices into operation as soon as the car reaches a predetermined speed in either direction, the same being so constructed and arranged that it is at all times ready for action, to provide for checking a dangerously high rate of speed of the car in either direction, without the necessity for resetting after one operation.

A further object of the invention is to provide means for preventing the operation of the controlling mechanism for the propelling power while the brakes are applied, whereby the brakes may be utilized as a means for securely locking the car at any floor, for purposes of loading and unloading the car, or at other point, without danger of interference from the hoisting mechanism, and without strain upon the hoisting cables or other part of the hoisting machinery.

A further object of the invention is to provide, in an elevator air brake system, means for automatically cutting off the propelling motor for the car when the pressure for the air brakes falls below that which is necessary for their operation, whereby the operator is prevented from starting the car unless he has sufficient pressure at hand for the operation of the brakes.

A further object of the invention is to provide, in connection with pneumatic means for applying the brakes and simultaneously cutting off the propelling power for the elevator, means on the car, within convenient reach of the operator, for controlling said pneumatic means, and means for indicating to the operator the condition of the pressure, so that he may know at all times that he has at hand the power to care for any dangerous condition that may arise.

Other objects of the invention will hereinafter appear, and the novel features thereof will be set forth in the claims.

Figure 8:
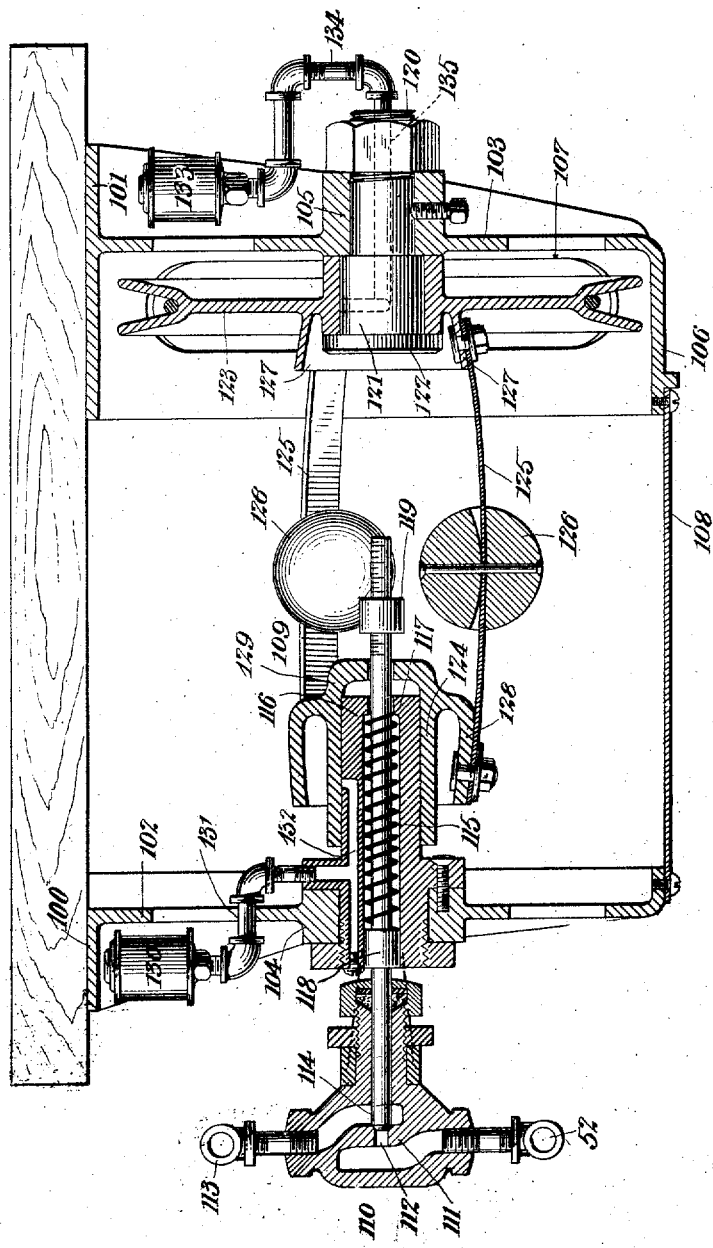
Figure 9:
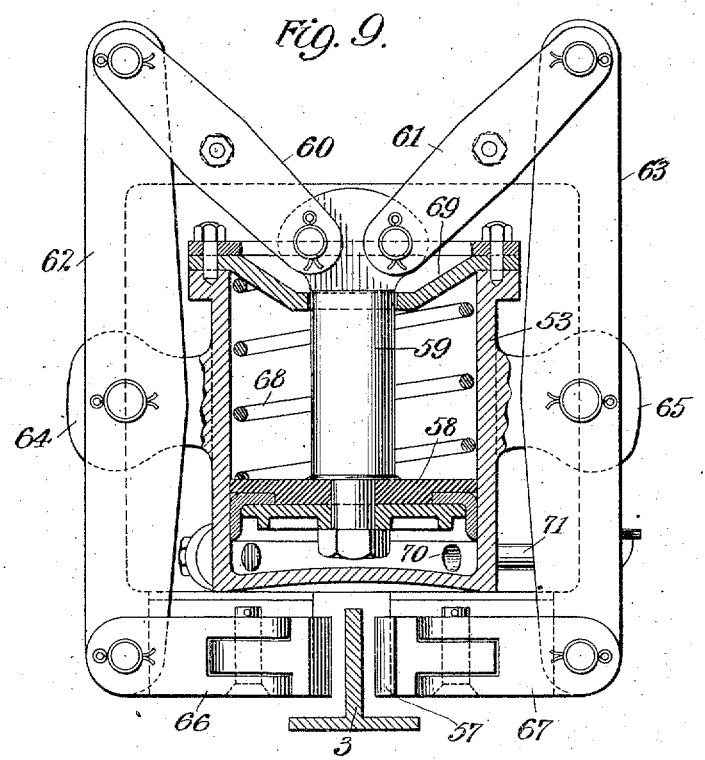
Figure 10:
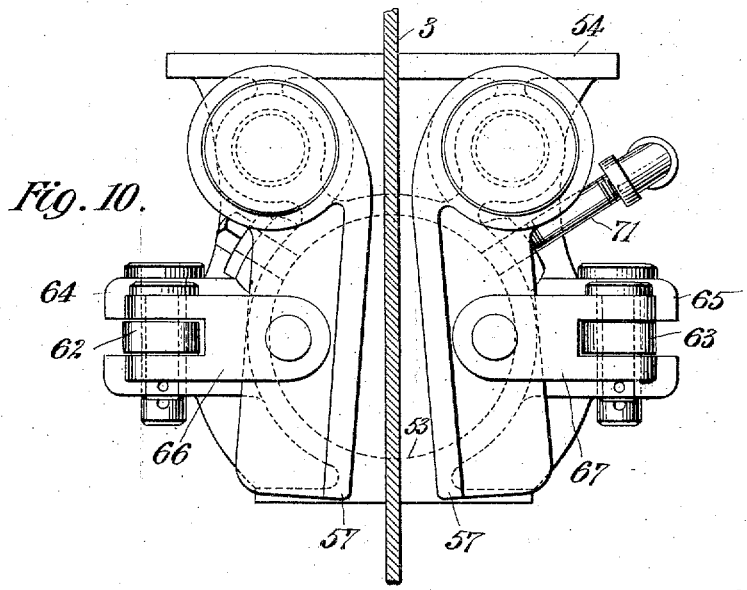

In the drawings, forming part of this specification, Figure 1 is a general view of the greater portion of my improved system, the various parts being diagrammatically arranged with respect to each other; Fig. 2 is a side elevation of the elevator shaft, showing a portion of the car therein and the parts carried thereby; Fig. 3 is a front elevation of the same, with parts in section; Fig. 4 is a sectional elevation of the shaft and car, with parts broken away, the section being taken on the line 4—4 of Fig. 5; Fig. 5 is a bottom plan view of the car; Fig. 6 is a detail sectional view of the automatic power cut off mechanism; Fig. 7 is a similar view of a modification of the same; Fig. 8 is a similar view of the governor and certain coöperating parts of the speed controlled mechanism; Fig. 9 is a sectional view of one of the brake cylinders; Fig. 10 is an elevation of the brake shoes; Fig. 11 is a sectional view of the operator's brake-controlling valve; Fig. 12 is a detail sectional view of one end of the auxiliary reservoir. Fig. 13 is a view, showing a diagrammatical arrangement of certain parts of my improved system which do not appear in Fig. 1, and Fig. 14 is a sectional elevation of an electric cut-out and the operating means therefor.

Corresponding parts are indicated by the same reference numerals in the different views.

My improved air brake system is adapted to be applied to elevators of any of the usual types, whether the propelling power therefor be hydraulic, electric, or any other. The car 1, the shaft 2 and the guide rails 3 may therefore be of any of the well known forms.

The instrumentalities which coöperate with each other and go to make up my improved system, comprise an auxiliary reservoir 4, an operator's brake controlling valve 5, braking mechanism 6, preferably arranged in duplicate, one set on each side of the car, automatic power cut-off mechanism 7, automatic speed-controlled mechanism 8, and the various air supply and transmitting pipes or conduits connected and coöperating therewith. The auxiliary reservoir 4 is carried by the car 1 and is preferably bolted or otherwise secured to the under side thereof, as shown. This reservoir is designed to hold a charge of air under a pressure of approximately seventy pounds to the square inch, although of course this exact pressure is not essential to the effective operation of the system. The said reservoir 4 is permanently connected with a main compressed air reservoir $4^a$, (Fig. 13) or other suitable source of air under pressure, through the fixed pipe or conduit 9, which extends to a point midway between the upper and lower ends of said shaft, and the flexible pipe 10. The free end of the flexible pipe 10 is provided with a coupling piece 11 which connects said pipe with a hollow casting 12 secured to one of the heads of the auxiliary reservoir 4. This casting 12 is provided with a central chamber 13 and with a valve casing 14 located within the reservoir 4. The chamber 13 communicates through a passage 15 with the valve casing 14, and in the latter is mounted a check valve 16 which is normally held in its closed position by the seating spring 17 which acts against a head or shoulder 18 on one end of the valve stem and against a perforated diaphragm 19 in the valve casing through which the stem of the valve passes. The auxiliary reservoir 4 being supplied with air under pressure from the main source of supply through the pipes 9 and 10, coupling piece 11, chamber 13, passage 15 and valve casing 14, it will be obvious that as the valve 16 is normally held in its closed position by the spring 17, if the pressure within the auxiliary reservoir 4 falls, due to leakage or to the operation of any of the devices which are supplied with air therefrom, the balance of the valve 16 will be disturbed, the latter will be opened, due to the increased pressure on the under side thereof, and the normal pressure within the reservoir 4 will be restored. As soon as the pressure on opposite sides of the valve 16 is equalized, the same will close either by gravity or through the action of the seating spring 17. Furthermore, should there be any leakage in the connections between the main source of supply and the auxiliary reservoir 4, the check valve 14 will serve to retain the pressure already in the reservoir 4, so that the brakes will still be operative.

The coupling piece 11 on the free end of the flexible pipe 10 is connected to an extension on the casting 12 having a port 20 therein, with which the coupling piece directly communicates, a port 21 above the port 20 and a passage 22 leading from the ports 20, 21, to the central chamber 13. Also connected with said extension and communicating with the port 21 therein, by means of the coupling piece 23, is a pipe 24 which leads up to a pressure indicator 25 located within the car 1 in plain view of the operator. The indicator 25 is a double indicator, the same being provided with hands or pointers 26, 27, the former being designed to indicate the pressure in the pipes leading from the main source of supply to the auxiliary reservoir 4, and the latter being designed to indicate the pressure in the reservoir 4. The pressure within the pipe 24 controls the movements of the hand or pointer 26. Accordingly, should there be any leak in the pipes 9 or 10, in the couplings 11 or 23, or in the connections between said couplings and the casting 12, it will be immediately indicated to the operator by the position of the hand 26 and the necessary provision may be made for correcting or overcoming such leakage. The auxiliary reservoir 4 has connected therewith a pipe 28 which communicates in a manner to be hereinafter described with a pipe 29 also leading to the indicator 25. The pressure in the reservoir 4 and in the pipes 28 and 29 acts upon the hand or pointer 27, so that should there be any leakage, or undue rise or fall of pressure, in the reservoir 4, it will be instantly indicated to the operator by the position of the hand 27. Of course if the indicator shows that there is insufficient pressure in the reservoir for the operation of the brakes, the operator should not start his car. The particular construction of the indicator 25 has not been shown or described, as it forms no part of my present invention and as such devices are old and well known in the art.

The operator's brake controlling valve 5 includes a casing 30 having a valve chamber 31 at its center, a cylinder 32 at one end and an operating lever 33 at the opposite end. Communicating with the valve chamber 31 are the ports 35, 36 and 37, and communicating with the cylinder 32 is a port 38. A transverse port 39 connects the inner end of the cylinder 32 with the port 37. A reciprocating valve or valve member 40 for controlling the ports 35, 36 and 37 is mounted in the chamber 31, the same being normally held to its seat by the spring 41. This valve is provided with a port or recess 40ª, which when in one position connects the ports 36 and 37 with each other, and when in another position connects the ports 35 and 36 with each other, and said valve may be operated either manually or automatically. The manual operation is effected by the lever 33 which is fulcrumed at 42 upon a bracket on, or an extension of, the casing 30. This lever is connected by means of the link 43 with the valve 40, so that when said lever is moved in one direction or the other, a corresponding movement will be imparted to said valve. The lower part of the lever 33 is mounted within a segmental casing 44 provided with notches 45 (preferably V-shaped) with which a downwardly spring-pressed bolt 46 on the lever 33, coöperates. These notches are three in number and are so spaced apart that the intermediate and two end positions of the lever 33 may be readily determined and indicated. In the movement of the lever 33 from one of its positions to another, a click will be produced when the bolt 46 enters any one of the notches 45. Said lever will also be held frictionally in any one of its three positions. The automatic operation of the valve 40 is effected by means of the piston 47 in the cylinder 32 which is connected by a link 48 with said valve. The particular conditions under which this automatic operation of the valve takes place will be hereinafter more fully described. The pipe 28 heretofore referred to as leading from the auxiliary reservoir 4, is connected to the casing 30 of the valve 5 and communicates with the port 35. The pipe 29 which leads to the indicator 25 is also connected to the valve casing 30 and communicates with the pipe 28 through the port 49. The port 36 communicates with a pipe 50 leading to the cylinders of the two sets of braking mechanism 6, in a manner to be described later, and the port 37 communicates with an exhaust pipe 51 which preferably leads down through the floor of the car 1 and discharges beneath the bottom thereof. The port 38 communicates with pipe 52 which in turn leads to the valve of the automatic speed controlled mechanism 8, which will be more fully described later.

The braking mechanism 6 has been shown as duplicated, one set of braking devices being located on each side of the car so as to coöperate with the guide rails 3 or with any other form of gripping rail, cable or the like which may be substituted for the guide rail. Each set of braking mechanism comprises a brake cylinder 53 bolted or otherwise secured to the bottom of the car 1 or to the supporting girder for such bottom. The body of the cylinder 53 is formed in a single casting with the bracket or frame 54 by which it is supported from the bottom of the car, and also formed integral therewith, is what I term a guideway bracket 55 which extends down below the cylinder 53 and carries the guide 56 which slides on the guide rail 3. This guideway bracket 53, however, may be dispensed with under certain conditions, for example, when the depth of the elevator shaft or pit is insufficient to permit of so long a projection beneath the bottom of the car, or when a separate gripping rail is employed for the brakes to operate upon, and in Fig. 10 of the drawing I have shown the brake cylinder 53 without such guideway bracket thereon. Pivotally supported upon the bracket or frame 54 and extending downwardly from their pivotal connections therewith are a pair of brake shoes 57 which embrace the web of the rail 3 and are preferably formed with roughened surfaces adjacent to said web. Within the brake cylinder 53 is a piston 58 whose piston-rod 59 is connected through the links 60 and 61 with levers 62, 63, fulcrumed upon ears 64, 65, on the sides of the cylinder 53. The links 60 are arranged in pairs, as are also the links 61, the members of each pair being located respectively upon opposite sides of the head of the piston rod 59 and of the levers 62 and 63. The outer ends of the levers 62 and 63 are connected through the pivoted links 66 and 67 with the brake shoes 57, so that when said levers are rocked in one direction or the other, they will move said brake shoes toward or away from the gripping rail 3 with which they coöperate.

The normal position of the piston 58 is that in which it is shown in Fig. 9 of the drawing. That is to say, it is normally located at a point near the outer end of the cylinder 53 in which it is mounted. It is held or urged to this position by means of a coil spring 68 located within the cylinder and bearing against the depressed or recessed inner head 69 thereof. An opening 70 is formed in the outer end of the cylinder 53 to which a pipe 71 is connected. This pipe leads to each of the cylinders 53 on opposite sides of the car and is itself connected with the pipe 50, heretofore referred to as leading from the casing of the operator's brake controlling valve 5. Through the pipe 71 air under pressure may be admitted to the outer end of the cylinder 53 behind the piston 58 therein. When pressure is thus admitted to the cylinder 53, the piston 58 is forced inwardly toward the center of the car against the force of the spring 68. This action through the links 60, 61, expands or separates the inner ends of the levers 62, 63, and forces inwardly the outer ends of said levers, which latter action in turn forces the brake shoes 57 into frictional engagement with the rail 3 and effects the desired braking action. As soon as the pressure is relieved from the cylinder 53, the parts are returned to their normal positions through the action of the spring 68, the said spring forcing the piston 58 outwardly, and, through the connections described, withdrawing the brake shoes 57 from their contact with the rail 3. The brake shoes are thus normally held away from the rail so that no rubbing, abrading and consequent wearing action of these parts can take place during the normal movement of the car up and down in its shaft. The advantage of the peculiar construction, location and arrangement of the brake cylinders 53, the link and lever connections with the brake shoes, and the guideway brackets 55, is that it enables me to assemble these parts in the most compact form so as to obtain the most perfect action with the greatest economy in space. At the same time, by reason of the construction shown and the compactness in the arrangement of the parts thereof, the cost of manufacture is minimized, and the installation facilitated,—but one alinement of the parts being required.

The guide rails 3 have been shown and described as the parts with which the brake-shoes 57 coöperate. It is possible to use the ordinary guide rails for this purpose when they have sufficient strength, as they frequently do, but when my improved system is applied to old installations having guide rails of wood, it will be necessary to employ separate gripping rails or cables for the brakes, the same being preferably in the form of T-rails secured within the shaft.

The automatic power cut-off mechanism has been shown in connection with a well known form of motor controlling means for elevators, consisting of a horizontally disposed rock shaft 72 mounted in suitable bearings beneath the floor of the car, laterally-extending arms 73 on said shaft, a motor controlling sheave 74 at the bottom of the elevator shaft 2 and a crossed cable 75 secured to the ends of said arms and passing around rollers 76 mounted on opposite sides of said sheave. The rock shaft 72 is actuated in the usual manner by the operator's power controlling lever 77 which extends up into the car 1 within convenient reach of the operator and is mounted in a segmental casing 78 provided with a central notch 79 in its upper edge with which the spring actuated bolt 80 on the lever 77 coöperates. The operation of this form of motor controlling mechanism is old and well known and a detail description thereof is not thought necessary. It may be said, however, that when the controlling lever 77 is at its central or vertical position, with the bolt 80 in the notch 79, the propelling motor for the elevator is cut off and when moved in one direction or the other away from this central or vertical position, the motor will be thrown into operation to either raise or lower the car. The automatic power cut-off mechanism 7 which I have shown in connection with the devices just described, is not, however, limited in its use to this particular form of motor controlling means, but is adapted to be used in connection with any form of motor controlling means whether the same be electrical or mechanical. This automatic power cut-off mechanism comprises a cylinder 81 adjustably secured to the under side of the car adjacent to the rock-shaft 72, by means of the bracket 82, the threaded bolts 83 which are secured to or form part of said bracket and pass through lugs 84 on the sides of the cylinder 81, and the nuts 85 on said bolts on opposite sides of said lugs. The purpose of this adjustability of the cylinder 81 is to provide for its location in proper position with respect to the rock shaft 72. Within the cylinder 81 is a piston 86 whose piston rod 87 projects through the head 88 of said cylinder and is itself provided with an external head 89, as clearly shown. The piston 86 is normally held in its retracted position, that is, in a position adjacent to the head 90 of the cylinder 81 by means of a coil spring 91 which bears against said piston at one end and against the head 88 of said cylinder at the other.

To limit the movement of the piston 86 toward the rock shaft 72, and to adjust the length of stroke of said piston in accordance with the relative positions of said rock shaft and the cylinder 81, the head 88 of said cylinder is provided with an inwardly extending externally screw-threaded boss 92 on which is mounted a nut or threaded collar 93. By adjusting the position of the nut 93 on the boss 92, it will be obvious that the length of the stroke of the piston 86 toward the rock-shaft 72 may be conveniently and accurately regulated. The purpose of this adjustment is to prevent any jamming action between the head 89 on the piston rod 87 and the rock shaft 72 or parts connected therewith. Bolted or otherwise secured to the rock shaft 72, as an attachment to said shaft, is a tappet arm 94 whose active face has been shown in a plane coincident with or parallel to the side edges of the operator's power controlling lever 77. The tappet arm 94 and the head 89 of the piston rod 87 are arranged to coöperate with each other, so that when the piston 86 is forced outwardly toward the rock shaft 72, the head 89 will be brought into engagement with the tappet arm 94, in whatever position this arm may be, and turn the shaft 72 to the position which it is caused to assume when the propelling power of the car is cut off. That is to say, whether the rock shaft 72 has been turned by the lever 77 in one direction or the other for cutting in the propelling motor for the purpose of raising and lowering the car, said rock-shaft will be automatically returned to the position it assumes when the power is cut off,—that is, its upright or central position,—when the piston 86 is forced outwardly, as the head 89 of the piston rod 87 will act upon either the upper or lower part of the tappet arm 94. The piston 86 is actuated by air under pressure entering the cylinder 81 through the head 90 thereof from a pipe 95. This pipe extends upwardly from the cylinder 81 and terminates in the casing 96 of a two-way valve 97. This valve casing connects with the pipes 50 and 51, which have heretofore been referred to as extending from the casing of the operator's brake controlling valve 5, and the valve 97 therein controls the communication between the pipes 50 and 95, and 95 and 51. The normal position of the valve 97 is with the handle 98 thereof raised. At this time the pipes 50 and 95 are in open communication one with the other. When the valve 97 is turned to the position shown in dotted lines, communication between the pipes 50 and 95 will be cut off, and communication between the pipes 95 and 51 will be established. Now it will be remembered that the pipe 50 leads to the two brake cylinders 53. When, therefore, said pipe 50 is charged with air under pressure for the purpose of applying the brakes, the pipe 95 will also be charged with air under pressure, which will enter the cylinder 81 and serve to operate the power controlling mechanism in the manner heretofore described. Thus, when the brakes are applied, the propelling power of the car is automatically cut off. In order to relieve the pressure in the cylinder 81 from behind the piston 86 therein, the valve 97 is turned to the position in which it is shown in dotted lines. At such time the pipe 95 will be thrown into communication with the exhaust pipe 51 and the air under pressure thus allowed to escape.

The power controlling means consisting of the rock shaft 72, the lever 77 and the parts coöperating therewith, is the one which is in most common use in the modern elevator. Another well known form of power controlling mechanism includes a rope or cable 98 which extends through the car in the shaft, and which is pulled downwardly when it is desired to raise the elevator, is pulled upwardly when it is desired to lower the elevator and is held stationary when it is desired to stop the elevator. My improved automatic power cut-off, which is thrown into operation when the brakes are applied, is equally adapted for use in connection with the cable 98, operating in the manner just referred to. When such a cable is employed, the cylinder 81 is located in comparatively close relation to said cable, as shown in Fig. 7 of the drawing, and the head 89 of the piston rod 87 acts directly on said cable, coöperating clamping means, such as the rollers 99, being employed on the opposite side of said cable. With this form of device, when the brakes are applied the piston 86 is forced outwardly and the cable 98 is held against movement relative to the car by being gripped between the head 89 of the piston rod 87 and the rollers or other equivalent means 99. When such cable 98 is thus held, the propelling power of the elevator is cut off in the usual and well known manner.

The operation of so much of my improved system as has been described, is as follows: The auxiliary reservoir 4 is normally charged with air under pressure, and the normal position of the operator's brake controlling valve is as shown in Figs. 1 and 11 of the drawing, in which the operating lever 33 is shown at the limit of its movement in one direction. At such time, the recess or port 40ᵃ in the valve member 40, connects the ports 36 and 37 with each other, while the port 35 is closed. At any time when it is desired to apply the brakes, the operating lever 33 is moved from the position in which it is shown, to one of its other two positions. In an emergency, or when it is desired to apply the brakes quickly, and with the greatest available force, the lever 33 is swung over to the extreme limit of its movement. The recess 40ᵃ in the valve member 40 then connects the ports 35 and 36 one with the other. As the port 35 communicates with the pipe 28 leading from the auxiliary reservoir 4, and as the port 36 connects with the pipes 50 and 71 leading to the brake cylinders 53, it will be seen that when the operating lever 33, which controls the movement of the valve member 40, is shifted to the position last described, the brake cylinders will be supplied with air under pressure from the auxiliary reservoir 4 over the following path: pipe 28, port 35, recess 40ᵃ of valve member 40, port 36, and pipes 50 and 71. This air under pressure entering the cylinders 53 behind the pistons 58 therein will force the latter inwardly toward the center of the car, against the action of the springs 68, and through the piston rods 59, links 60, 61, levers 62, 63, and links 66, 67, will force the brake shoes 57 into engagement with the rails 3 with sufficient force to instantly arrest the movement of the heaviest car. In order to apply the brakes upon each side of the car, therefore, it is merely necessary for the operator to shift the lever 33 from its normal position to the limit of its stroke in the opposite direction. If it be desired to apply the brakes gently, the operating lever 33 is moved to a position intermediate the ends of its stroke, that is, to a position in which the spring bolt 46 rests within the center notch 45 in the segmental casing 44. As the movement of the valve member 40 is effected by the operating lever 33, it will be obvious that when said lever is in the last mentioned position, the recess 40ᵃ in said valve member 40 will only partially uncover the port 35. That is to say, one end of the recess 40ᵃ will lie in a position intersecting the end of the port 35. At such time, although the ports 35 and 36 are connected one with the other, the passage through the port 35 will be restricted and consequently the air under pressure from the auxiliary reservoir 4 to the brake cylinders 53 will flow more slowly and will act to apply the brakes in a more gradual manner.

As heretofore indicated, the pipes 50 and 95 are normally in communication with each other through the two-way valve 97. When, therefore, the valve member 40 is moved by the operating lever 33 to open communication between the auxiliary reservoir 4, and the brake cylinders 53, through the pipes 28, 50 and 71, and the ports 35 and 36, a portion of the compressed air entering the pipe 50 at its upper end will pass therefrom through the valve 97 into the pipe 95, and thence flow to the cylinder 81 of the automatic power cut-off mechanism 7. Entering this cylinder the same acts to force outwardly the piston 86, against the action of the spring 91, and the head 89 on the piston rod 87, acting upon the tappet arm 94 of the rock shaft 72, serves to return said rock shaft to the position which it occupies when the car is at rest. That is to say, it turns the rock shaft 72 in one direction or the other so that the arms 73 thereof will move the cable 75 and the motor controlling sheave 74 so as to cut off the propelling power for the car. Thus it will be seen that as soon as the brakes are applied the propelling power for the car is automatically cut off. This is an important feature of the invention, as otherwise the brakes would have to act against the power exerted by the propelling motor, especially if the accident were threatened by, or the emergency due to, the racing of the car upwardly. Under the latter circumstances, it follows that the hoisting ropes or some other part would either be broken or damaged.

To release the brakes and restore to the operator the power of controlling the propelling motor through the lever 77, it is merely necessary to return the valve operating lever 33 and the valve member 40 to their normal positions. When said valve member has actually been returned to its normal position, however, as shown in Fig. 11 of the drawings, the connections above described, between the auxiliary reservoir 4 and the brake cylinders 53, and between said reservoir and the cylinder 81 of the automatic power cut-off mechanism, are broken by the closure of the upper end of the port 35 by the valve member 40. As the ports 36 and 37 are now in open communication with each other through the recess 40ᵃ of the valve member 40, the air under pressure in the brake cylinders 53 and in the cylinder 81 may escape to the atmosphere through the exhaust pipe 51 over the following paths: from the brake cylinders 53 through the pipes 71 into the pipe 50, and from the cylinder 81 through the pipe 95 and valve 96 into the pipe 50, and from the pipe 50 through the port 36, recess 40ᵃ of valve member 40, and port 37, into and through the exhaust pipe 51. When the brake cylinders 53 are thus relieved of pressure the pistons 58 and the brake shoes 57 are returned to their normal positions, through the connections between these parts, by the springs 68. When the pressure is relieved from the cylinder 81 in the manner described, the piston 86 in said cylinder is returned to its normal position through the action of the spring 91, and the head 89 on the end of the piston rod 87 is moved out of the path of movement of the tappet arm 94 on the rock shaft 72. Consequently, the rock shaft is free to be turned by the lever 77, and the propelling motor of the car is thus returned to the control of the operator.

While the brakes may be released and the power of controlling the propelling motor returned to the operator, in the manner just described, that is, by returning the valve operating lever 33 to its normal position, it is important that means be provided for returning the power of control of the propelling motor to the operator, without actually releasing the brakes. This may be done by turning the valve 97 to the position shown in dotted lines in Figs. 1 and 11 of the drawings. At such time, the pipe 95 is cut off from the pipe 50, and is thrown into communication with the exhaust pipe 51. The pressure in the cylinder 81 of the automatic power cut-off mechanism is thus relieved, while the pressure in the brake cylinders 53 is maintained. The brakes are thus held applied, whereas, through the action of the spring 91 in the cylinder 81, the head 89 on the piston 86 is moved from its engagement with the tappet arm 94 on the rock shaft 72, and the operator is given control of the motor. The car may at such time be lowered slowly in the shaft by gradually moving the lever 33 of the operator's brake controlling valve 5 toward its normal position.

The operation of the brakes, with the consequent operation of the automatic power cut-off mechanism, above described, is that which is effected through the manual operation of the operator's controlling valve 5 effected by shifting the lever 33. In addition to this operation of the brakes and the automatic power cut-off mechanism by the action of the operator, I have provided means whereby the brakes may be automatically applied and the propelling power of the elevator automatically cut off, when the speed of the car in one direction or the other exceeds a certain predetermined limit. This is effected by means of the automatic speed controlled mechanism, which has been heretofore referred to generally by the reference numeral 8, and the same will now be described. In order that its operation may be fully appreciated, however, it should be understood that the brake shoes 57, when applied, will act just as well to arrest the movement of the car when the latter is moving upwardly as they will when it is moving downwardly. The said brake shoes are constructed as will be seen by reference to Fig. 10 of the drawing, so that when the same are actuated in the manner heretofore described, they will bear against the flange of the rail 3 throughout an extended area of surface running from a point adjacent to the pivots of said shoes to their free ends. This peculiar construction of the brake shoes, together with the fact that a practically unlimited power may be obtained behind them, from the compressed air, renders it possible to obtain the most effective braking action, and also makes it possible to arrest the movement of the heaviest car in the shortest possible space within the limits of safety from shock due to a too sudden stopping movement of the car. It should also be understood that by the provision of automatic means for throwing the brakes into operation, actuated when the speed of the car becomes accelerated beyond the point of safety, I provide for the condition of danger which would exist in the event that the hoisting ropes of the car should break. With such an accident the tendency of the car would be to fall by gravity from the point where the breakage occurred to the bottom of the shaft. This, however, would involve an acceleration of the movement of the car in a downward direction which would throw into operation the automatic speed controlled mechanism for applying the brakes.

The speed controlled mechanism 8 comprises a casing bolted or otherwise secured to the under side of the car 1, the said casing consisting of the end brackets 100, 101, provided with perforated arch-shaped webs 102, 103, constituting the heads of the casing, and having central bosses 104, 105 thereon. The bracket 101 is extended inwardly from the web 103 thereof, the said extension 106 forming a part of the sides and bottom of said casing and being provided with elongated openings 107 for a purpose which will presently appear. The casing referred to is completed by the curved sides and bottom which are formed by a strip of sheet metal 108 secured at its ends respectively to the extension 106 of the bracket 101 and to a flange extending around the periphery of the web 102 of the bracket 100. Within this casing is a governor, represented generally by the numeral 109, which controls a valve 110. The casing of this valve is provided with a central diaphragm 111 having an opening 112 therein whose walls constitute the valve seat, and said casing is connected on one side of said diaphragm by the pipe 113 with the auxiliary reservoir 4, and on the other side of said diaphragm with the pipe 52, heretofore referred to as communicating through the port 38 with the cylinder 32 at one end of the casing 30 of the operator's brake controlling valve 5. The valve 110 is normally closed by the movable valve member or needle 114, which coöperates with and normally lies in contact with the seat 112, the said member 114 being urged to its closing position, and being normally held upon its seat 112, by a coil spring 115. The said spring is inclosed within a hollow arbor 116 extending through and secured to the boss 104 in any suitable manner, and bears against a shoulder 117 at one end of said arbor and against a collar 118 on the stem of the valve or valve member 114. The arbor 116, as indicated, is fixed in position, and extends inwardly within the casing between the brackets 100 and 101, which constitute the ends thereof. It is somewhat elongated, and its outer surface within said casing is cylindrical, so as to form a bearing for the longitudinally movable member of the governor 109. The stem of the valve 114 also extends inwardly through and beyond the end of the arbor 116 and carries an adjustable collar 119 for a purpose which will presently appear.
Extending through and secured within the boss 105 of the bracket 101 is a bearing bolt 120, having an enlarged portion 121, within said boss, and a head 122 on its inner end. Mounted for rotation upon the enlarged portion 121 of said bearing bolt is a sheave 123, which, as shown, is entirely inclosed within the extension 106 of the bracket 101, opposite the elongated openings 107 therein. The governor 109 which controls the valve 110 consists of the longitudinally movable member 124, in the form of a sleeve mounted on the arbor 116, the flexible straps 125, and the balls or weights 126 attached to said straps at points intermediate their ends. One end of each of the straps 125 is connected to a flange 127 on the inner side of the sheave 123 adjacent to its hub, and the other end of each of said straps is connected to the hollow extended portion 128 of the sleeve 124. The said sleeve 124 is capable of turning and longitudinal movement on the arbor 116, and the inner end thereof is formed with a head 129, which partially incloses the inner end of said arbor and is provided with an opening through which the stem of the valve 114 passes. This head 129 is adapted to engage the collar 119 on the valve stem when the sleeve 124 is drawn inwardly, and thereby open the valve 114. From the construction just described, it will be seen that as the sheave 123 is rotated, its turning movement will be transmitted to the sleeve 124 and the balls 126, through the straps 125. When the valve 114 is in its closed position the head 129 of the sleeve 124 will be slightly separated from the collar 119 on the stem of said valve.
As the speed of rotation of the sheave 123, in either direction, increases, the balls 126 will be thrown outwardly by centrifugal force, which action will bow the straps 125 and draw the sleeve 124 toward the sheave 123. When the head 129 comes into engagement with the collar 119, any further inward movement of said sleeve will move the valve 114 with it and separate it from its seat 112. The collar 119 is adjustable on the stem of the valve 114, so that the position at which the sleeve 124 is capable of acting upon the valve 114 may be accurately controlled. Means have been shown whereby the bearing between the sleeve 124 and the arbor 116 may be lubricated, the same consisting of an oil cup 130, a pipe 131 leading therefrom, and a passage 132 cut in the arbor 116, which extends to the periphery of said arbor as shown. The lubricating material flows by gravity to the bearing surfaces. Similar lubricating means for the bearing between the sheave 123 and the bearing bolt 121, have also been illustrated, the same consisting of an oil cup 133, pipe 134 leading from the bottom thereof, and a port 135 extending through the bolt 121 and terminating at its periphery.

The governor 109 is operated by the movement of the car 1, and when the speed of the car attains a certain predetermined limit, the governor acts to open the valve 110 and establish communication between the auxiliary reservoir 4 and the cylinder 32 of the operator's brake-controlling valve 5. To effect this transmission of motion from the car to the governor, I employ a rope or cable 136, extending vertically of the shaft 2, and passing around the sheave 123. This cable is sustained from a bracket 137 at the top of the shaft, extends downwardly therefrom, passes around a sheave 138, mounted in a bracket 139 secured to the under side of the car 1, adjacent to the side of the shaft, thence passes around the sheave 123, thence around a second sheave 140, also mounted on the bracket 139, parallel to the sheave 138, and thence extends downwardly to the bottom of the shaft. In order that there may be no slipping of the cable 136 on the sheaves 123, 138 and 140, I employ a slack take-up mechanism at the bottom of the shaft, comprising a roller 141, around which the cable passes, and a bracket 142 to which the extreme upper end of said cable is fixed. The bracket 142 is in the form of a cross-piece which connects the upper ends of two guide rods 143. The roller 141 is mounted in bearings in a weighted block 144 through openings in the sides of which the guide rods 143 pass. This block 144 tends to draw downwardly upon the cable 136, and to maintain good frictional contact between said cable and the sheaves 123, 138 and 140 at all times. This action may be augmented by the coil springs 145 surrounding the guide rods 143 and acting upon the upper side of the block 144.

From the foregoing description it will be seen that as the car 1 moves up and down in its shaft, the sheave 123 will be rotated at a speed proportional to the speed of movement of said car, this rotation of said sheave being effected by the cable 136 which passes around it and the sheaves 138 and 140 in the manner just described. If the speed of the car either up or down increases, the speed of rotation of sheaves 123 will correspondingly increase, and the balls 126 of the governor 109 will be thrown outwardly by centrifugal force. If the speed of the car, due to accident or otherwise, exceeds a certain predetermined limit, the sleeve 124 of the governor 109 will be moved so that the head 129 thereof will be brought into engagement with the collar 119 on the stem of the valve 114, and the latter valve will be opened. Instantly the brakes will be automatically applied with sufficient force to arrest the movement of the car, and at the same time the propelling power for the elevator will be cut off. This is effected in the following manner: When the valve 114 is opened, communication will be established between the auxiliary reservoir 4 and the cylinder 32 of the operator's brake controlling valve 5 over the following path: Pipe 113, valve 110, pipe 52, and port 38. The air under pressure enters the cylinder 32 behind the piston 47 and forces the latter to the right, carrying with it the valve member 40 until the latter assumes the position heretofore described, where the recess 40ª therein connects the ports 35 and 36. At such time the air under pressure from the auxiliary reservoir 4 is caused to flow into the brake cylinder 53 over the path heretofore traced, with the result that the brakes are applied, and at the same time air under pressure from the auxiliary reservoir 4 also passes to the cylinder 81, over the path also heretofore traced, and acts to automatically cut off the propelling power. Thus, when the car begins to race either up or down and attains a dangerous rate of speed, either intentionally, or because of some accident, due to the death, absence, or incapacity of the operator, or to the breakage of the hoisting ropes, the dangerous condition is immediately removed by instantly cutting off the power and applying the brakes. When the valve 110 is opened, and the air under pressure enters the cylinder 32 behind the piston 47, in the manner just described, the said piston 47 is moved until the port 39 in the valve casing 30 is uncovered. This is not done, of course, until the valve member 40 has been moved so as to open communication between the ports 35 and 36 and the brakes have been applied, but as soon as the brakes have been applied and the speed of the car has been arrested, the valve 114 recloses through the action of the spring 115. As soon as the piston 47 reaches the position where the port 39 is opened to communication with the outer end of the cylinder 32, the air in the pipe 52, port 38, and cylinder 32 behind the piston 47 is permitted to escape through the port 39 and the exhaust pipe 51. Thus, as soon as the valve 40 has been automatically moved to such position as to apply the brakes and cut off the power, the valve 110 is automatically returned to its normal closed position, and the pressure behind the piston 47 removed. The valve 40 is then under the control of the operator through the handle 33, and the automatic speed controlled mechanism is ready for immediate action again as soon as a dangerous condition, due to an increased speed of the car, arises.

As the propelling motor for the car is automatically cut off as soon as the brakes are applied, it will be seen that the brakes may be employed for locking the car at any floor, for purposes of loading or unloading the same, without in any way straining the hoisting ropes or hoisting machinery and without the danger of the hoisting mechanism or propelling motor acting in opposition to the restraining or locking power of the brakes which would tend to injure or break some of the parts.

In addition to those features of my invention which have been described, I have provided means for automatically throttling the propelling motor for the car when the air pressure for the brakes falls below that which is necessary to effectively operate the same. Thus, the operator is prevented from even starting his car unless there is sufficient power at hand to provide for the operation of the brakes and care for any accident which may occur. This feature of my invention is illustrated in Figs. 13 and 14 of the drawings, and while it comprehends the use of any form of propelling motor for the car, the same has been illustrated in connection with a well known type of electric motor. This motor 145 operates a hoisting drum 146, and is controlled by the motor controlling sheave 74, the sheave 147, and the cable 148 which passes around said sheaves and transmits the movement of the former to the latter. When the sheave 74 is tilted or shifted by the operation of the rock shaft 72, in the manner heretofore described, a corresponding movement will be transmitted to the sheave 147, and the latter will act through the rheostat in the controller box 148ª to stop, reverse or vary the speed of the motor. As all of this mechanism is old and well known, it is not deemed necessary to go into a detail description thereof. It is sufficient to say that current is supplied to the motor through the wires 149, 150, from a generator or other suitable source of supply, and that a cut-out 151 is provided in the motor circuit.

The main compressed air reservoir 4ª which supplies the auxiliary reservoir 4 on the car, through the pipes 9 and 10 heretofore referred to, the former having a reducer 152 therein, is normally maintained at a pressure of, say, one hundred pounds to the square inch, by one or the other of the compressors 153. Each of these compressors comprises an engine cylinder 154 and two compression cylinders 155, the engine cylinders being supplied with steam from any suitable source through the supply pipe 156. From the latter pipe lead two branch pipes 157 having valves 158 therein by means of which one of the compressors may be cut off while the other is in operation. Also located in each of the pipes 157 is a pressure-controlled valve 159, the same communicating with the interior of the reservoir 4ª and held normally closed by the pressure within said reservoir. Each of said valves 159 is provided with a spring, however, which when the pressure within the reservoir 4ª falls, serves to open its valve and throw one or the other of the compressors 153 into operation. This construction provides for maintaining a constant pressure within the main reservoir $4^a$. The cut-out 151, which constitutes a throttling device for the motor, comprises a cylinder 160, connected at one end through the pipe 161 with the reservoir $4^a$. Within this cylinder is a piston 162 which is acted upon by the pressure in the main reservoir $4^a$, in one direction, and by the spring 163, in the opposite direction. The tension of the spring 163, may be adjusted by the screw 164. On the base of the cut-out 151 are two pairs of contacts 165, 166, and 167, 168, the ends of the two parts of the wire 149 being connected to the contacts 165 and 166, and the ends of the two parts of the wire 150 being connected to the contacts 167, 168. Coöperating with these contacts are the switch blades 169, 170, the same being pivoted, respectively, to the contacts 165 and 167 and adapted, when depressed, to engage the contacts 166 and 168, respectively. These blades have been shown as L-shaped, one of the branches of each being forked and operatively connected to the piston 162. When there is sufficient pressure in the compressed air reservoir $4^a$ to force the piston 162 outwardly in the cylinder 160, the blades 169 and 170 will be thrown into engagement with the contacts 166 and 168, and the circuit through the wires 149 and 150 to the motor 145 will be closed. This will be the normal position of the parts when the motor is in operation. But should the pressure within the reservoir $4^a$ fall, it will be obvious that the motor circuit through the wires 149 and 150 will be broken through the action of the spring 163 in forcing the piston 162 rearwardly, and the consequent action of said piston in separating the blades 169 and 170 from the contacts 166, 168. The pressure in the reservoir $4^a$, however, which acts upon the piston 162 in the cylinder 160, is the same pressure which supplies the auxiliary reservoir on the car, which through the connections described, operates the brakes. When, therefore, the pressure in the reservoir $4^a$ falls below that which is necessary for the operation of the brakes, either through the failure of the compressors 153 to operate, or from any other cause, the propelling motor for the elevator will be automatically throttled or cut off, so that the operator is prevented from even starting his car when there is insufficient pressure at hand to operate the brakes.

Having described my invention, I claim:—

1. In an elevator air brake system, pneumatic means for automatically cutting off the propelling power for the elevator when the brakes are applied.

2. In an elevator air brake system, braking devices, power cut-off mechanism, and coöperating pneumatic means for throwing both into operation at the same time.

3. In an elevator air brake system, braking devices, power cut-off mechanism, and pneumatic means for throwing the braking devices into operation and automatically actuating the power cut-off mechanism.

4. In an elevator air brake system, braking devices, power cut-off mechanism, means for throwing the braking devices into operation, and pneumatic means, automatically thrown into operation at the same time, for actuating the power cut-off mechanism.

5. In an elevator air brake system, a brake, a brake cylinder through which the same is operated, power cut-off mechanism, a cylinder through which the latter is operated, and means for simultaneously supplying fluid under pressure to both of said cylinders.

6. In an elevator air brake system, a brake, a brake cylinder through which the same is operated, power cut-off mechanism, a cylinder through which the latter is operated, means for simultaneously supplying fluid under pressure to both of said cylinders, and means for independently relieving the pressure in the cylinder for the cut-off mechanism.

7. In an elevator air brake system, a brake, a brake cylinder through which the same is operated, power cut-off mechanism, a cylinder through which the latter is operated, a reservoir for fluid under pressure, connections between said reservoir and said cylinders, and a valve in said connections for opening communication between said reservoir and both of said cylinders.

8. In an elevator air brake system, a brake, a brake cylinder through which the same is operated, power cut-off mechanism, a cylinder through which the latter is operated, a reservoir for fluid under pressure, connections between said reservoir and said cylinders, a valve in said connections for opening communication between said reservoir and both of said cylinders, and a second valve for independently exhausting the pressure in the cylinder for the cut-off mechanism, as and for the purpose set forth.

9. In an elevator air brake system, a brake, a brake cylinder through which the same is operated, power cut-off mechanism, a cylinder through which the latter is operated, a reservoir for fluid under pressure, an operator's brake controlling valve, comprising a casing having a plurality of ports therein and a movable valve member controlling said ports, a pipe leading from said reservoir to one of said ports, a pipe leading from said cylinders to another of said ports, and means for operating said valve member for the purpose of opening and closing communication between said ports.

10. In an elevator air brake system, a brake, a brake cylinder through which the same is operated, power cut-off mechanism, a cylinder through which the latter is operated, a reservoir for fluid under pressure, an operator's brake-controlling valve, comprising a casing having a series of ports therein and a movable valve member controlling said ports, a pipe leading from said reservoir to one of said ports, a pipe leading from said brake cylinder to another of said ports, an exhaust pipe leading from the third of said ports, a valve casing connecting the exhaust pipe with the pipe leading to the brake cylinder, a two-way valve therein, a pipe leading from the cylinder for the cut-off mechanism to the casing of said two-way valve, and means for operating the valve member of the operator's brake controlling valve.

11. In an elevator air brake system, a brake, a brake cylinder for operating the same, power cut-off mechanism comprising a motor-controlling sheave, a cable operatively connected therewith, a rock shaft, and laterally extending arms thereon secured to said cable, a tappet arm on said shaft, a cylinder, a piston therein having a head adapted to engage said tappet arm for returning said shaft to its normal inoperative position, and means for simultaneously supplying fluid under pressure to both of said cylinders, whereby the brake will be applied and the propelling power for the elevator cut off.

12. In an elevator air brake system, a brake, a brake cylinder, a piston therein, operative connections between the piston and brake, a reservoir for fluid under pressure, an operator's brake-controlling valve, comprising a casing having a series of ports therein and a movable valve member for controlling said ports, a pipe leading from said reservoir to one of said ports, a pipe leading from said brake cylinder to the other of said ports, the third of said ports discharging into the atmosphere and constituting an exhaust, and means for operating said valve member for connecting said brake cylinder with said reservoir, at one time, and with the atmosphere or exhaust, at another time.

13. In an elevator air brake system, a brake, a brake cylinder, a piston therein, operative connections between the piston and brake, a reservoir for fluid under pressure, an operator's brake-controlling valve, comprising a casing having a plurality of ports therein and a movable valve member for controlling said ports, a pipe leading from said reservoir to one of said ports, a pipe leading from said brake cylinder to the other of said ports, the third of said ports discharging into the atmosphere and constituting an exhaust, manual means for operating said valve member, and automatic means for operating the same, the said automatic means being controlled by the speed of movement of the elevator.

14. In an elevator air brake system, a brake, a brake cylinder, a piston therein, operative connections between the piston and brake, an operator's brake controlling valve, comprising a casing having a valve chamber therein and a series of ports communicating with said chamber, a movable valve member controlling said ports, and means for holding said valve member to its seat, a reservoir for fluid under pressure, a pipe leading from said reservoir to one of said ports, a pipe leading from said brake cylinder to another of said ports, the third port communicating with the atmosphere and constituting an exhaust, and means for operating said valve member to establish communication between said reservoir and said brake cylinder, at one time, and between said brake cylinder and the atmosphere, at another time.

15. In an elevator air brake system, a brake, a brake cylinder, a piston therein, operative connections between the piston and brake, an operator's brake controlling valve, comprising a casing having a valve chamber therein and a series of ports communicating with said chamber, a reciprocating valve member controlling said ports, and means for holding said valve member to its seat, a reservoir for fluid under pressure, a pipe leading from said reservoir to one of said ports, a pipe leading from said brake cylinder to another of said ports, the third port communicating with the atmosphere and constituting an exhaust, an operating lever, and connections between the said lever and said valve member, whereby the latter may be shifted from one of its positions to another to open communication between the auxiliary reservoir and the brake cylinder, at one time, and between the brake cylinder and the atmosphere, at another time.

16. In an elevator air brake system, the combination with a reservoir for fluid under pressure and a brake cylinder through which the braking devices are actuated, of an operator's brake controlling valve, comprising a casing having a valve chamber therein and a series of ports leading into said chamber, a pipe leading from said reservoir to one of said ports, a pipe leading from said brake cylinder to another of said ports, the third port communicating with the atmosphere and constituting an exhaust, a movable valve member in the chamber of said casing controlling said ports, means for holding said valve member to its seat, manual means for actuating said valve member, and automatic means for actuating the same, the said automatic means being controlled by the speed of movement of the car.

17. In an elevator air brake system, a brake, pneumatic means for applying the brake, a governor controlling the brake applying means, the said governor being carried by the car and including a sheave through which it is actuated, and a relatively stationary cable passing around said sheave, whereby the brakes will be automatically applied when a certain predetermined speed is attained by the car, in either direction.

18. In an elevator brake system, a brake, power cut-off mechanism, and means controlled by the speed of movement of the car for applying the brake and actuating the power cut-off mechanism.

19. In an elevator air brake system, a brake, power cut-off mechanism, means for applying the brake and simultaneously actuating the power cut-off mechanism, a governor controlling the brake-applying and power cut-off actuating means, the said governor being carried by the car and including a sheave through which it is actuated, and a relatively stationary cable passing around said sheave, whereby the brake will be applied and the power cut-off mechanism actuated when a certain predetermined speed is attained by the car in either direction.

20. In an elevator air brake system, a brake, manual and automatic means for applying the brake, the automatic means including a governor carried by the car and having a sheave through which it is actuated, and a relatively stationary cable passing around said sheave, whereby the brake will be applied when a certain predetermined speed is attained by the car in either direction.

21. In an elevator brake system, a brake, power cut-off mechanism, manual and automatic means for throwing the brake into operation and actuating the power cut-off mechanism, the automatic means being controlled by the speed of movement of the car.

22. In an elevator air brake system, a brake cylinder through which the brake is operated, a source of supply for fluid under pressure, and means controlled by the speed of movement of the car for automatically opening connections between said source of supply and said cylinder and for continuously maintaining the same in open condition, whereby the brake is applied, and held applied, by the entire pressure within the source of supply.

23. In an elevator air brake system, a brake cylinder through which the brake is operated, manual means for opening, and continuously maintaining open, the connections between said source of supply and said cylinder, and means, controlled by the speed of movement of the car, for automatically effecting the same result, whereby the brake is applied and held applied by the entire pressure within said source of supply.

24. In an elevator air brake system, a brake cylinder through which the brake is operated, power cut-off mechanism, a cylinder through which the power cut-off mechanism is automatically actuated, and means controlled by the speed of movement of the car for supplying air under pressure to both of said cylinders.

25. In an elevator air brake system, a brake cylinder through which the brake is operated, power cut-off mechanism, a cylinder through which the power cut-off mechanism is automatically actuated, manual means for supplying fluid under pressure to both of said cylinders, and means, controlled by the speed of movement of the car, for automatically effecting the same result.

26. In an elevator air brake system, a brake cylinder through which the brake is operated, a reservoir for fluid under pressure, and means, controlled by the speed of movement of the car, for automatically establishing and continuously maintaining communication between said reservoir and said brake cylinder.

27. In an elevator air brake system, a brake cylinder through which the brake is operated, a reservoir for fluid under pressure, manual means for establishing and continuously maintaining communication between said reservoir and cylinder, and means, controlled by the speed of movement of the car, for automatically effecting the same result.

28. In an elevator air brake system, a brake cylinder through which the brake is operated, power cut-off mechanism, a cylinder through which said power cut-off mechanism is automatically actuated, a reservoir for fluid under pressure, and means, controlled by the speed of movement of the car, for automatically establishing communication between said reservoir and both of said cylinders.

29. In an elevator air brake system, a brake cylinder through which the brake is operated, power cut-off mechanism, a cylinder through which said power cut-off mechanism is automatically actuated, a reservoir for fluid under pressure, manually operated means for establishing communication between said reservoir and both of said cylinders, and means, controlled by the speed of movement of the car, for automatically effecting the same result.

30. In an elevator air brake system, a brake cylinder through which the brake is operated, a reservoir for fluid under pressure, a normally closed valve in the connections between said reservoir and cylinder, adapted to be operated by the pressure from said reservoir, separate connections between said reservoir and said valve, whereby the same is actuated, a second valve in said separate connections, and means, controlled by the speed of movement of the car, for automatically actuating said second valve, whereby the former valve is opened and communication is established and continuously maintained between said reservoir and brake cylinder.

31. In an elevator air brake system, a brake cylinder through which the brake is operated, power cut-off mechanism, a cylinder through which the power cut-off mechanism is automatically actuated, a reservoir for fluid under pressure, normally closed connections between said reservoir and said cylinders, a valve controlling said connections, and means, controlled by the speed of movement of the car, for automatically actuating said valve and opening said connections.

32. In an elevator air brake system, a brake cylinder through which the brake is operated, a reservoir for fluid under pressure, a normally closed valve in the connections between said reservoir and said cylinder adapted to be operated by the pressure from said reservoir, manually operated means for actuating said valve, separate connections between the reservoir and said valve whereby the latter is actuated, a second valve in said separate connections, and means, controlled by the speed of movement of the car, for automatically actuating said second valve, whereby the former valve is opened and communication is established and continuously maintained between said reservoir and brake cylinder.

33. In an elevator air brake system, a brake cylinder through which the brake is operated, power cut-off mechanism, a cylinder through which said power cut-off mechanism is automatically actuated, a reservoir for fluid under pressure, normally closed connections between said reservoir and said cylinders, a valve controlling said connections, manually operated means for actuating said valve to open said connections, and means, controlled by the speed of movement of the car, for automatically actuating said valve to effect the same result.

34. In an elevator air brake system, a brake cylinder through which the brake is operated, a reservoir for fluid under pressure, an operator's brake controlling valve, comprising a casing having a plurality of ports therein, connections between said reservoir and one of said ports and between said cylinder and another of said ports, a valve member controlling said ports, and means, controlled by the speed of movement of the car, for automatically actuating said valve member to connect said ports one with the other.

35. In an elevator air brake system, a brake cylinder through which the brake is operated, a reservoir for fluid under pressure, an operator's brake controlling valve, comprising a casing having a plurality of ports therein, connections between said reservoir and one of said ports and between said cylinder and another of said ports, a valve member controlling said ports, manually operated means for actuating said valve member to connect said ports one with the other, and means, controlled by the speed of movement of the car, for automatically actuating said valve member to accomplish the same result.

36. In an elevator air brake system, a brake cylinder through which the brake is operated, power cut-off mechanism, a cylinder through which the power cut-off mechanism is automatically actuated, a reservoir for fluid under pressure, an operator's brake controlling valve, comprising a casing having a plurality of ports therein, connections between said reservoir and one of said ports and between said cylinders and the other of said ports, a valve member controlling said ports, and means, controlled by the speed of movement of the car, for automatically actuating said valve member to connect said ports one with the other.

37. In an elevator air brake system, a brake cylinder through which the brake is operated, power cut-off mechanism, a cylinder through which the power cut-off mechanism is automatically actuated, a reservoir for fluid under pressure, an operator's brake controlling valve, comprising a casing having a plurality of ports therein, connections between said reservoir and one of said ports and between said cylinders and the other of said ports, a valve member controlling said ports, manually operated means for actuating said valve member to connect said ports one with the other, and means, controlled by the speed of movement of the car, for automatically actuating said valve member to effect the same result.

38. In an elevator air brake system, a brake cylinder through which the brake is operated, a reservoir for fluid under pressure, normally closed connections between said reservoir and cylinder, a valve controlling said connections, a cylinder having a piston therein through which said valve is actuated to open said connections, connections between said reservoir and the latter cylinder, a normally closed valve therein, and a governor actuated by the movement of the car for controlling the latter valve, whereby when the car attains a certain predetermined speed, the latter valve will be opened, the former valve will be actuated, and communication will be established between the reservoir and the brake cylinder for applying the brake.

39. In an elevator air brake system, a brake cylinder through which the brake is operated, a reservoir for fluid under pressure, normally closed connections between said reservoir and brake cylinder, a valve controlling said connections, manual operating means for said valve, for opening and closing said connections, a cylinder, a piston therein operatively connected to said valve, connections between said reservoir and the latter cylinder, a normally closed valve therein, and a governor actuated by the movement of the car for controlling the latter valve, whereby the former valve may be operated, by hand, to establish communication between the reservoir and the brake cylinder, and whereby when the car reaches a certain predetermined speed, the latter valve will be opened, communication will be established between the reservoir and the cylinder for the former valve, and said former valve will be automatically actuated for establishing communication between the reservoir and the brake cylinder.

40. In an elevator air brake system, a brake cylinder through which the brake is operated, power cut-off mechanism, a cylinder through which the power cut-off mechanism is automatically actuated, a reservoir for fluid under pressure, normally closed connections between said reservoir and said cylinders, a valve controlling said connections, a cylinder, a piston therein connected with said valve for operating it to open the connections controlled thereby, connections between said reservoir and the latter cylinder, a valve therein, and a governor controlling the latter valve and actuated by the movement of the car, whereby, when the car reaches a certain predetermined speed, the latter valve will be opened, the former valve will be actuated by the fluid under pressure from said reservoir, the brake will be applied and the automatic power cut-off mechanism will be operated.

41. In an elevator air brake system, a brake cylinder through which the brake is operated, power cut-off mechanism, a cylinder through which the power cut-off mechanism is automatically actuated, a reservoir for fluid under pressure, normally closed connections between said reservoir and said cylinders, a valve controlling said connections, manually operated means for actuating said valve to open said connections, a cylinder, a piston therein connected with said valve for operating it to open the connections controlled thereby, connections between said reservoir and the latter cylinder, a valve therein, and a governor controlling the latter valve and actuated by the movement of the car, whereby when the car reaches a certain predetermined speed, the latter valve will be opened, the former valve will be actuated by the fluid under pressure from said reservoir, the brakes will be applied, and the automatic power cut-off mechanism will be operated.

42. In an elevator air brake system, a brake cylinder through which the brake is operated, a reservoir for fluid under pressure, an operator's brake controlling valve, comprising a casing having a valve chamber therein and a series of ports leading into said chamber, a pipe connecting said reservoir with one of said ports, a pipe connecting said brake cylinder with another of said ports, the third port communicating with the atmosphere and constituting an exhaust, a valve member in said chamber normally connecting the port leading to the brake cylinder with the exhaust port, but adapted to be moved so as to close the exhaust port and connect the ports leading respectively to the reservoir and to the brake cylinder, a cylinder secured to said casing, a piston therein connected to said valve member for operating it, a pipe leading from said reservoir to the latter cylinder, a normally closed valve in said pipe, and a governor actuated by the movement of the car for opening the latter valve, whereby when the car reaches a certain predetermined speed, air under pressure is admitted behind said piston, said valve member is shifted from one of its positions to the other, and communication is established between the reservoir and the brake cylinder for applying the brake.

43. In an elevator air brake system, a brake cylinder through which the brake is operated, a reservoir for fluid under pressure, an operator's brake controlling valve, comprising a casing having a valve chamber therein and a series of ports leading into said chamber, a pipe connecting said reservoir with one of said ports, a pipe connecting said brake cylinder with another of said ports, the third port communicating with the atmosphere and constituting an exhaust, a valve member in said chamber normally connecting the port leading to the brake cylinder with the exhaust port, but adapted to be moved so as to close the exhaust port and connect the ports leading respectively to the reservoir and to the brake cylinder, an operating lever, connections between said lever and said valve member, whereby it may be manually shifted from one of its positions to the other, a cylinder secured to said casing, a piston therein connected to said valve member for operating it, a pipe leading from said reservoir to the latter cylinder, a normally closed valve in said pipe, and a governor actuated by the movement of the car for opening the latter valve, whereby when the car reaches a certain predetermined speed, air under pressure is admitted behind said piston, said valve member is shifted from one of its positions to the other, and communication is established between the reservoir and the brake cylinder for applying the brake.

44. In an elevator air brake system, a brake cylinder through which the brake is operated, power cut-off mechanism, a cylinder through which the power cut-off mechanism is automatically actuated, a reservoir for fluid under pressure, an operator's brake controlling valve, comprising a casing having a valve chamber therein and a series of ports leading into said chamber, a pipe leading from the reservoir to one of said ports, a pipe leading from the brake cylinder to another of said ports, a pipe leading from the cylinder of the cut-off mechanism to the latter pipe, the third port being in communication with the atmosphere and constituting an exhaust, a valve member in said chamber normally connecting the port leading to said cylinders with the exhaust port, but adapted to be moved so as to cut off the exhaust port and connect the ports which lead respectively to said reservoir and to said cylinders, a cylinder connected to said casing, a piston therein connected to said valve member for shifting it from one of its positions to the other, pipe connections between said reservoir and the latter cylinder, a normally closed valve in said connections, and a governor operated by the movement of the car for controlling the latter valve, whereby when the car attains a certain predetermined speed the latter valve will be opened, fluid under pressure will be supplied behind said piston from said reservoir, said valve member will be shifted from one of its positions to the other, communication will be established between the reservoir, the brake cylinder and the cylinder for the cut-off mechanism, the brake will be applied and the propelling power of the elevator cut off.

45. In an elevator air brake system, a brake cylinder through which the brake is operated, power cut-off mechanism, a cylinder through which the power cut-off mechanism is automatically actuated, a reservoir for fluid under pressure, an operator's brake controlling valve, comprising a casing having a valve chamber therein and a series of ports leading into said chamber, a pipe leading from said reservoir to one of said ports, a pipe leading from the brake cylinder to another of said ports, a pipe leading from the cylinder of the cut-off mechanism to the latter pipe, the third port being in communication with the atmosphere and constituting an exhaust, a valve member in said chamber normally connecting the port leading to said cylinders with the exhaust port, but adapted to be moved so as to cut off the exhaust port and connect the ports which lead respectively to said reservoir and to said cylinders, an operating lever, connections between said lever and said valve member for manually shifting the latter from one of its positions to the other, a cylinder connected to said casing, a piston therein connected to said valve member for shifting it from one of its positions to the other, pipe connections between said reservoir and the latter cylinder, a normally closed valve in said connections, and a governor operated by the movement of the car, for controlling the latter valve, whereby, when the car attains a certain predetermined speed, the latter valve will be opened, fluid under pressure will be supplied behind said piston from said reservoir, said valve member will be shifted from one of its positions to the other, communication will be established between the reservoir and the brake cylinder and the cylinder for the cut-off mechanism, the brake will be applied and the propelling power of the elevator cut off.

46. In an elevator air brake system, a brake cylinder through which the brake is operated, a reservoir for fluid under pressure, an operator's brake controlling valve, comprising a casing having a valve chamber therein and a series of ports leading into said chamber, one of said ports constituting an exhaust, another connected with the brake cylinder and the third connected with the reservoir, a valve member in said chamber normally connecting the port leading to the brake cylinder with the exhaust port, but adapted to be shifted so as to cut off the exhaust port and connect the ports which lead respectively to the brake cylinder and to the reservoir, a cylinder connected with said casing having a port leading from an intermediate point therein to said exhaust port, a piston in the latter cylinder connected with said valve member for operating it, pipe connections between said reservoir and the latter cylinder, a normally closed valve in said connections, and a governor, operated by the movement of the car, for controlling the latter valve, whereby when the car reaches a certain predetermined speed the latter valve will be opened, a supply of fluid under pressure will be admitted to the cylinder behind said piston, said valve member will be shifted from one position to the other, communication will be established between the reservoir and the brake cylinder, the brake applied, and the pressure behind said piston permitted to escape.

47. In an elevator air brake system, a brake cylinder through which the brake is operated, power cut-off mechanism, a cylinder through which the cut-off mechanism is automatically actuated, a reservoir for fluid under pressure, an operator's brake controlling valve, comprising a casing having a valve chamber therein, and a series of ports leading to said chamber, one of said ports constituting an exhaust, another leading to said cylinders and the third leading to said reservoir, a valve member in said chamber normally connecting the port leading to said cylinders with the exhaust port, but adapted to be shifted so as to cut off the exhaust and connect the ports leading respectively to the said cylinders and to said reservoir, manually operated means for shifting said valve from one of its positions to the other, a cylinder connected to said casing having a port leading therefrom to said exhaust port, a piston in the latter cylinder connected with said valve member for operating it, pipe connections between said reservoir and the latter cylinder, a normally closed valve in said connections, and a governor operated by the movement of the car for controlling the latter valve, whereby when the car reaches a certain predetermined speed, the latter valve will be opened, a supply of fluid under pressure will be supplied from said reservoir to the cylinder behind said piston, said valve member will be shifted from one of its positions to the other, communication will be established between said reservoir, said brake cylinder and the cylinder of the cut-off mechanism, and the pressure behind said piston will be permitted to escape.

48. In an elevator air brake system, the combination with a brake cylinder through which the brake is operated, a reservoir on the car for fluid under pressure, connections between said cylinder and said reservoir, and means for controlling said connections, of a main source of supply for fluid under pressure, a connection between said source and said reservoir, and means for maintaining a constant pressure in said reservoir consisting of a valve through which the pressure from the main source of supply enters said reservoir, and means, automatically thrown into operation when the pressure within said reservoir falls, for opening said valve.

49. In an elevator air brake system, the combination with a brake cylinder through which the brake is operated, an auxiliary reservoir on the car for fluid under pressure, connections between said cylinder and said reservoir, and means for controlling said connections, of a main source of supply for fluid under pressure, connections between said source and said reservoir, a double pressure indicator on the car provided with a plurality of hands or pointers, and pipes leading respectively from said auxiliary reservoir and from the latter connections to said indicator, as and for the purpose set forth.

50. In an elevator brake system, means for automatically cutting off the propelling motor when the brake power falls below that which is necessary for the operation of the brakes.

51. In an elevator brake system, a propelling motor for the car, braking devices, and a source of power for operating the braking devices, in combination with means for automatically throttling the motor when the operating power for the brakes falls below that which is necessary for their operation.

52. In an elevator brake system, a propelling motor for the car, braking devices, and a source of power for operating the braking devices, in combination with a throttling device for said motor, and means for automatically actuating said throttling device when the power for operating the brakes falls below that which is necessary for their operation.

53. In an elevator air brake system, a propelling motor for the car, braking devices, and a source of fluid under pressure for actuating said braking devices, in combination with means for throttling or cutting off said propelling motor when the pressure in said source falls below that which is necessary for the effective operation of the braking devices.

54. In an elevator air brake system, a propelling motor for the car, braking devices, and a source of fluid under pressure for actuating said braking devices, in combination with a throttling device for said motor, and means for automatically actuating said throttling device when the pressure in said source falls below that which is necessary for the effective operation of the braking devices.

55. In an elevator air brake system, a propelling motor for the car, braking devices, and a reservoir for fluid under pressure through which said braking devices are actuated, in combination with a throttling device for said motor, comprising a cylinder communicating with said reservoir, a piston therein and a spring acting upon said piston in opposition to the pressure from said reservoir, whereby, when the pressure in said reservoir falls, said throttling device will be automatically thrown into operation.

56. In an elevator air brake system, an electric motor for propelling the car, braking devices, and a reservoir for fluid under pressure through which said braking devices are actuated, in combination with an electric cut-out in the motor circuit, normally held in closed position by the pressure in said reservoir, and means for automatically opening said cut-out when the pressure in said reservoir falls below that which is necessary for the operation of the braking devices.

57. In an elevator air brake system, an electric motor for propelling the car, braking devices, and a reservoir for fluid under pressure through which said braking devices are actuated, in combination with an electric cut-out in the motor circuit, comprising a cylinder communicating with said reservoir, a piston in said cylinder, a spring acting on said piston in opposition to the pressure from said reservoir, and a movable part operatively connected with said piston and coöperating with contacts in the motor circuit, whereby the motor circuit is normally held closed by the pressure from said reservoir, but is automatically opened when the pressure in said reservoir falls.

In witness whereof, I subscribe my signature, in the presence of two witnesses.

ALFRED H. MEECH.

Witnesses:
WM. M. STOCKBRIDGE,
FRANK S. OBER.